(12) United States Patent
Lee

(10) Patent No.: US 11,443,172 B2
(45) Date of Patent: Sep. 13, 2022

(54) SYNAPSE ARRAY OF NEUROMORPHIC DEVICE INCLUDING SYNAPSES HAVING FERRO-ELECTRIC FIELD EFFECT TRANSISTORS AND OPERATION METHOD OF THE SAME

(71) Applicant: SK hynix Inc., Icheon (KR)

(72) Inventor: Hyung-Dong Lee, Hwaseong-si (KR)

(73) Assignee: SK hynix Inc., Icheon-si (KR)

(*) Notice: Subject to any disclaimer, the term of this patent is extended or adjusted under 35 U.S.C. 154(b) by 1340 days.

(21) Appl. No.: 15/810,160

(22) Filed: Nov. 13, 2017

(65) Prior Publication Data

US 2018/0349761 A1    Dec. 6, 2018

(30) Foreign Application Priority Data

Jun. 5, 2017    (KR) .................. 10-2017-0069519

(51) Int. Cl.
*G06N 3/063*    (2006.01)
*G06N 3/04*    (2006.01)

(52) U.S. Cl.
CPC ............. *G06N 3/063* (2013.01); *G06N 3/049* (2013.01)

(58) Field of Classification Search
CPC .... G06N 3/063; G06N 3/049; G11C 11/4023; G11C 11/22
See application file for complete search history.

(56) References Cited

U.S. PATENT DOCUMENTS

| 5,621,336 A | 4/1997 | Shibata et al. | |
| 5,923,184 A | 7/1999 | Ooms et al. | |
| 6,847,071 B2 | 1/2005 | Ueda et al. | |
| 2002/0185690 A1 | 12/2002 | Ueda et al. | |
| 2012/0084241 A1* | 4/2012 | Friedman | G06N 3/049 706/27 |
| 2015/0178619 A1 | 6/2015 | Nishitani et al. | |
| 2016/0203858 A1* | 7/2016 | Kim | G06N 3/049 706/25 |
| 2017/0061278 A1 | 3/2017 | Lee | |
| 2018/0012123 A1* | 1/2018 | Han | G06N 3/049 |

FOREIGN PATENT DOCUMENTS

CN    104240753 A    12/2014

OTHER PUBLICATIONS

Notification of the First Office Action from National Intellectual Property Administration of People's Republic of China for Application No. or Patent No. 201810116451.X, dated Oct. 8, 2021.

* cited by examiner

*Primary Examiner* — Abdullah Al Kawsar
*Assistant Examiner* — Tewodros E Mengistu

(57) ABSTRACT

A synapse array of a neuromorphic device is provided. The synapse array may include a pre-synaptic neuron; a row line extending from the pre-synaptic neuron in a row direction; a post synaptic neuron; a column line extending from the post-synaptic neuron in a column direction; and a synapse disposed at an intersection region between the row line and the column line. The synapse may include an n-type ferro-electric field effect transistor (n-FeFET) having a source electrode, a gate electrode and a body; a p-type ferroelectric field effect transistor (p-FeFET) having a source electrode, a gate electrode and a body; and a resistive element having a first node electrically connected to the source electrode of the n-FeFET and electrically connected to the source electrode of the p-FeFET, and the n-FeFET and the p-FeFET are electrically connected in series.

12 Claims, 9 Drawing Sheets

SYNAPSE ARRAY OF NEUROMORPHIC DEVICE INCLUDING SYNAPSES HAVING FERRO-ELECTRIC FIELD EFFECT TRANSISTORS AND OPERATION METHOD OF THE SAME

The present patent application claims priority under 35 U.S.C. § 119(a) to Korean Patent Application No. 10-2017-0069519, filed on Jun. 5, 2017, which is incorporated herein by reference in its entirety.

BACKGROUND

1. Field

The present disclosure relates to a synapse array and a synapse of a neuromorphic device having ferroelectric field effect transistors and resistive elements, and a method for operating the synapse array and the synapse of the neuromorphic device having the ferroelectric field effect transistors and the resistive elements.

2. Description of the Related Art

Recently, much attention has been paid to devices in the field of neuromorphic technology, which use chips to mimic the human brain. A neuromorphic device based on the neuromorphic technology includes a plurality of pre-synaptic neurons, a plurality of post-synaptic neurons, and a plurality of synapses. The neuromorphic device outputs pulses or spikes having various levels, amplitudes, and/or times, according to a learning state of the neuromorphic device.

SUMMARY

Embodiments of the present disclosure include synapses having ferroelectric field effect transistors and resistive elements, and a synapse array of synapses of a neuromorphic device.

Other embodiments of the present disclosure include a synapse configured to perform both an excitatory synapse operation and an inhibitory synapse operation, and a synapse array of synapses of a neuromorphic device.

Further embodiments of the present disclosure include methods of excitatory synapse operations and inhibitory synapse operations of synapses having ferroelectric field effect transistors and resistive elements.

The objectives of the present disclosure are not limited to the above-mentioned objectives and embodiments. Other objectives and embodiments may be understood by those skilled in the art in light of the present disclosure.

In an embodiment of the present disclosure, a synapse array of a neuromorphic device may include a pre-synaptic neuron; a row line extending from the pre-synaptic neuron in a row direction; a post synaptic neuron; a column line extending from the post-synaptic neuron in a column direction; and a synapse disposed at an intersection region between the row line and the column line. The synapse may include an n-type ferroelectric field effect transistor (n-FeFET) having a source electrode, a gate electrode and a body; a p-type ferroelectric field effect transistor (p-FeFET) having a source electrode, a gate electrode and a body; and a resistive element having a first node electrically connected to the source electrode of the n-FeFET and electrically connected to the source electrode of the p-FeFET, and the n-FeFET and the p-FeFET are electrically connected in series.

The resistive element may include a second node electrically connected to the column line.

The n-FeFET may further have a drain electrode electrically connected to a first reference voltage node. The p-FeFET may further have a drain electrode electrically connected to a second reference voltage node.

The first reference voltage node may provide a relatively high voltage and the second reference voltage node may provide a relatively low voltage.

The row line may include a first synaptic row line and a second synaptic row line. The first synaptic row line may be electrically connected to the first reference voltage node.

The second synaptic row line may be electrically connected to the second reference voltage node.

The row line may further include a third synaptic row line. The third synaptic row line may be electrically connected to the gate electrode of the n-FeFET.

The third synaptic row line may be electrically connected to the gate electrode of the p-FeFET.

The second reference voltage node may be electrically connected to a ground voltage node.

The first reference voltage node may be electrically connected to a power supply voltage node.

The synapse may further include an input port electrically connected to the gate electrode of the n-FeFET and electrically connected to the gate electrode of the p-FeFET.

The body of the n-FeFET may be electrically connected to the source electrode of the n-FeFET. The body of the p-FeFET may be electrically connected to the source electrode of the p-FeFET.

In an embodiment of the present disclosure, a synapse array of a neuromorphic device may include a first synaptic row line and a second synaptic row line extending in parallel in a row direction; a column line extending in a column direction; and a synapse. The synapse may include an n-FeFET having a source electrode and having a drain electrode electrically connected to the first synaptic row line; a p-FeFET having a source electrode and having a drain electrode electrically connected to the second synaptic row line; and a resistive element, having a first node electrically connected to the source electrode of the n-FeFET and electrically connected to the source electrode of the p-FeFET, and having a second node electrically connected to the column line.

The n-FeFET may further include a gate electrode. The p-FeFET may further include a gate electrode. The synapse may further include an input port electrically connected to the gate electrode of the n-FeFET and electrically connected to the gate electrode of the p-FeFET.

The n-FeFET may further include a body. The p-FeFET may further include a body. The body of the n-FeFET may be electrically connected to the body of the p-FeFET.

The source electrode of and the body of the n-FeFET, and the source electrode of and the body of the p-FeFET may be electrically connected to each other.

In an embodiment of the present disclosure, a method of operating a neuromorphic device may include setting a first polarization voltage and a second polarization voltage of the neuromorphic device and applying a read voltage to the neuromorphic device to enable current flow. The first polarization voltage may be greater than the second polarization voltage. The neuromorphic device may include a first port; an n-FeFET having a gate electrode electrically connected to a first port, having a drain electrode electrically connected to a first reference voltage node, and having a source electrode; a p-FeFET having a gate electrode electrically connected to the first port, having a drain electrode electrically connected to a second reference voltage node, and having a source electrode; a resistive element having a first node electrically connected to the source electrode of the n-FeFET and electrically connected to the source electrode of the p-FeFET, and having a second node; and a second port electrically connected to the second node of the resistive element. The first polarization voltage may be set at the gate electrode of the n-FeFET. The second polarization voltage may be set at the gate electrode of the p-FeFET. The read voltage may be applied to the first port enabling current flow from the first reference voltage node to the second port through the n-FeFET and through the resistive element.

The neuromorphic device may further include a pre-synaptic neuron and a row line extending from the pre-synaptic neuron in a row direction, and a post-synaptic neuron and a column line extending from the post-synaptic neuron in a column direction, and the first port is electrically connected to the pre-synaptic neuron through the row line. The second port may be electrically connected to the post-synaptic neuron through the column line.

The neuromorphic device may further include a pre-synaptic neuron and a first row line and a second row line extending from the pre-synaptic neuron in a row direction, and a post-synaptic neuron and a column line extending from the post-synaptic neuron in a column direction, and the first port is electrically connected to the pre-synaptic neuron through the first row line. The second port may be electrically connected to the pre-synaptic neuron through the second row line.

In an embodiment of the present disclosure, a method of operating a neuromorphic device may include setting a first polarization voltage and a second polarization voltage of the neuromorphic device and applying a read voltage to the neuromorphic device to enable current flow. The second polarization voltage may be greater than the first polarization voltage. The neuromorphic device may include a first port; an n-FeFET having a gate electrode electrically connected to the first port, having a drain electrode electrically connected to a first reference voltage node, and having a source electrode and a body; a p-FeFET having a gate electrode electrically connected to the first port, having a drain electrode electrically connected to a second reference voltage node, and having a source electrode and a body; a resistive element having a first node electrically connected to the source electrode of the n-FeFET and electrically connected to the source electrode of the p-FeFET, and having a second node; and a second port electrically connected to the second node of the resistive element. The first polarization voltage may be set at the gate electrode of the n-FeFET and the second polarization voltage may be set at the gate electrode of the p-FeFET. The read voltage may be applied to the first port enabling current flow from the second port to the second reference voltage node through the resistive element and through the p-FeFET.

The body of and the source electrode of the n-FeFET and the body of and the source electrode of the p-FeFET may be electrically connected to each other.

DETAILED DESCRIPTION

Figure 1A:
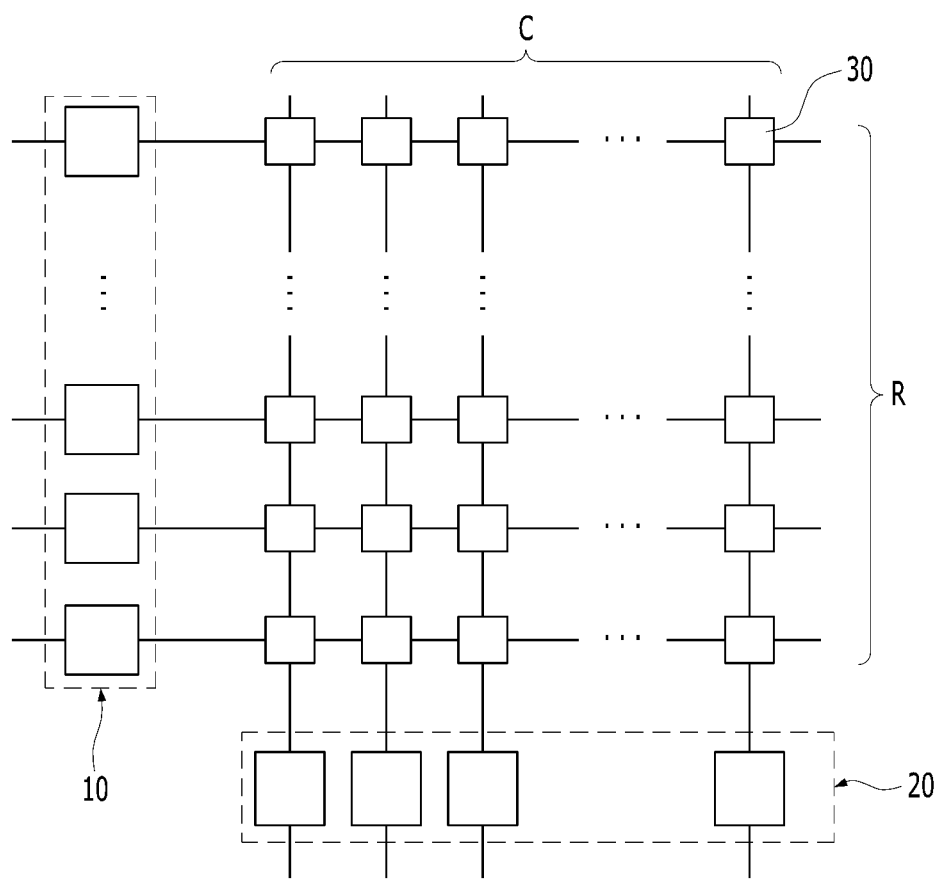
FIGS. 1A to 1C are diagrams schematically illustrating synapse arrays of neuromorphic devices in accordance with embodiments of the present disclosure.

Various embodiments will be described below in more detail with reference to the accompanying drawings. Embodiments of the present disclosure may, however, have different forms and should not be construed as limited to the embodiments set forth herein. Rather, these embodiments are provided so that this disclosure will be thorough and complete, and will fully convey the scope of the claims to those skilled in the art.

Throughout the specification, like reference numerals refer to the same elements. Therefore, although the same or similar reference numerals are not mentioned or described in the corresponding drawing, the reference numerals may be described with reference to other drawings. Furthermore, although elements are not represented by reference numerals, the elements may be described with reference to other drawings.

In this specification, 'potentiating,' 'setting,' 'learning,' and 'training' may be used as the same or similar terms, and 'depressing,' 'resetting,' and 'initiating' may be used as the same or similar terms. For example, an operation of lowering resistances of synapses may be described as potentiating, setting, learning, or training, and an operation of increasing the resistances of synapses may be described as depressing, resetting, or initiating. Furthermore, when synapses are potentiated, set, or trained, a gradually increasing voltage/current may be outputted because the conductivities of the synapses are increased. On the other hand, when synapses are depressed, reset, or initiated, a gradually decreasing voltage/current may be outputted because the conductivities of the synapses are decreased. For convenience of description, the terms 'data pattern,' 'electrical signal,' 'pulse,' 'spike,' and 'fire' may have the same, a similar, or a compatible meaning. Furthermore, the terms 'voltage' and 'current' may also be interpreted as having the same or a compatible meaning.

Figure 1B:
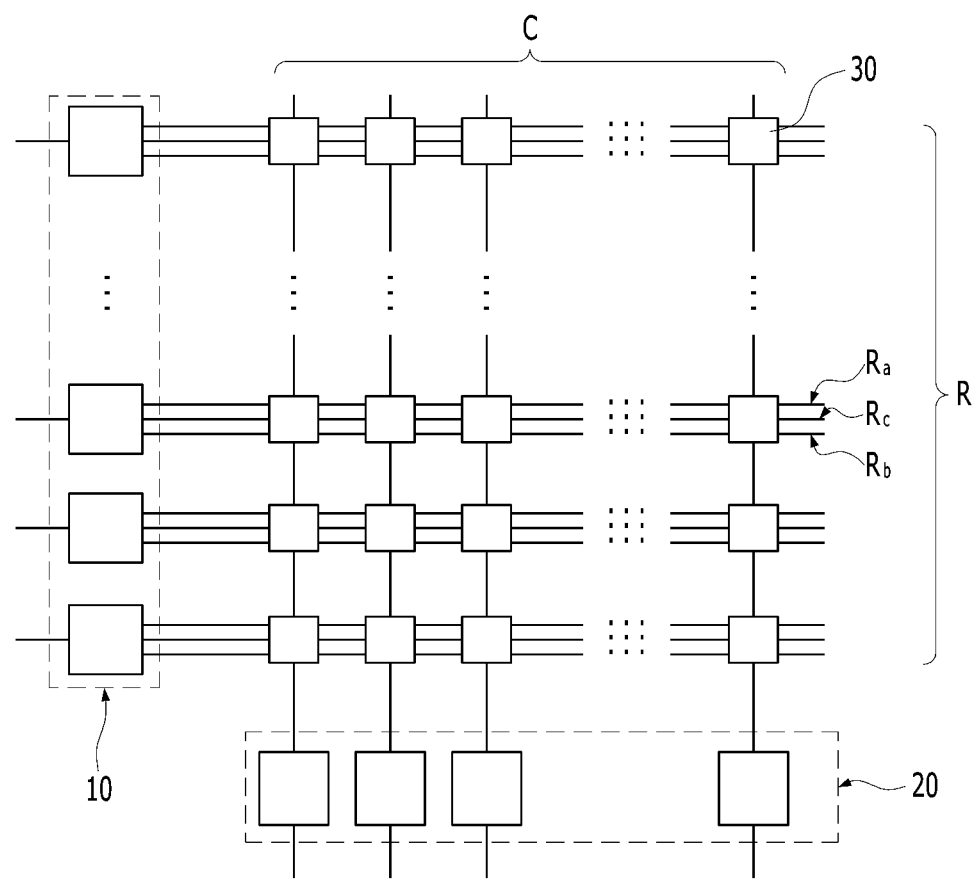
Figure 1C:
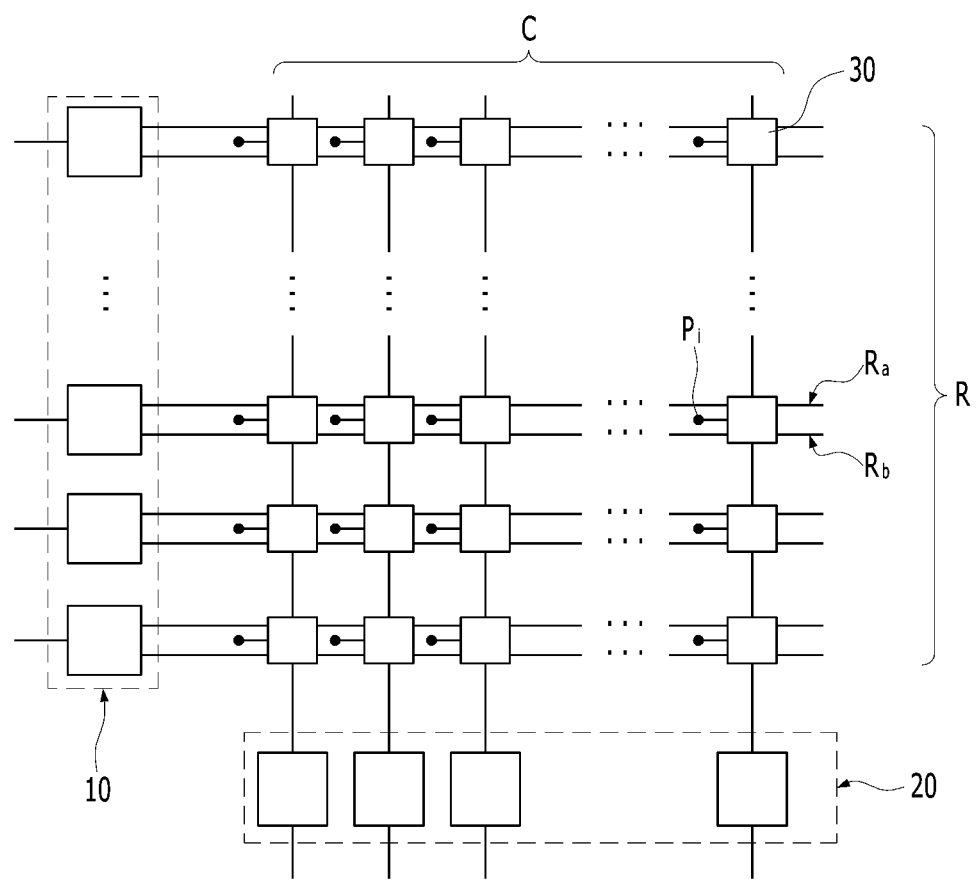

FIGS. 1A to 1C are diagrams schematically illustrating synapse arrays of neuromorphic devices in accordance with embodiments of the present disclosure.

Referring to FIG. 1A, a synapse array of a neuromorphic device in an embodiment of the present disclosure may include a plurality of pre-synaptic neurons 10, a plurality of row lines R extending from the pre-synaptic neurons 10 in a row direction, a plurality of post-synaptic neurons 20, a plurality of column lines C extending from the plurality of post-synaptic neurons 20 in a column direction, and a plurality of synapses 30 disposed on intersections between the row lines R and the column lines C. That is, synapses 30 may be disposed in intersection regions between row lines R and column lines C.

The pre-synaptic neurons 10 may be circuits that generate electrical pulses and transmit the electrical pulses to the synapses 30 through the row lines R in a learning mode, a reset mode, or a read-out mode.

The post-synaptic neurons 20 may be circuits that generate electrical pulses and transmit the electrical pulses to the synapses 30 through the column lines C in a learning mode or a reset mode, and may receive the electrical pulses from the synapses 30 through the column lines C in a read-out mode.

Each of the synapses 30 may have a synapse weight that may vary from the synapse weight of one or more other synapses 30. For example, a synapse 30 may have a positive (+) synapse weight for performing an excitatory synapse operation to increase the synapse current on a column line C, or a negative (−) synapse weight for performing an inhibitory synapse operation to reduce the synapse current on a column line C.

Referring to FIG. 1B, a synapse array of a neuromorphic device in accordance with an embodiment may include a plurality of pre-synaptic neurons 10, a plurality of row lines R extending from the pre-synaptic neurons 10 in a row direction, a plurality of post-synaptic neurons 20, a plurality of column lines C extending from the post-synaptic neurons 20 in a column direction, and a plurality of synapses 30 disposed on intersections between the row lines R and the column lines C. That is, synapses 30 may be disposed in intersection regions between row lines R and column lines C.

Each row line R may include a first synaptic row line Ra, a second synaptic row line Rb, and a third synaptic row line Rc, each electrically connected to one or more synapses 30. The first synaptic row lines Ra may provide a relatively high voltage to the synapses 30, and the second synaptic row lines Rb may provide a relatively low voltage to the synapses 30. The third synaptic row lines Rc may provide mode selection signals to select an operation mode of the synapses 30. For example, the third synaptic row lines Rc may provide a read voltage to the synapses 30 to read the synapse weights of the respective synapses 30 in a read-out mode.

Referring to FIG. 1C, a synapse array of a neuromorphic device in accordance with an embodiment of the present disclosure may include a plurality of pre-synaptic neurons 10, a plurality of row lines R extending from the pre-synaptic neurons 10 in a row direction, a plurality of post-synaptic neurons 20, a plurality of column lines C extending from the post-synaptic neurons 20 in a column direction, and a plurality of synapses 30 disposed on intersections between the row lines R and the column lines C. That is, synapses 30 may be disposed in intersection regions between row lines R and column lines C.

Each row line R may include a first synapse row line Ra and a second synapse row line Rb, each electrically connected to one or more synapses 30. The first synaptic row lines Ra may provide a relatively high voltage to the synapses 30, and the second synaptic row lines Rb may provide a relatively low voltage to the synapses 30. Each of the synapses 30 may include an input port Pi. The input port Pi may provide a read voltage to read the synapse weights of the respective synapses 30 in a read-out mode.

Figure 2:
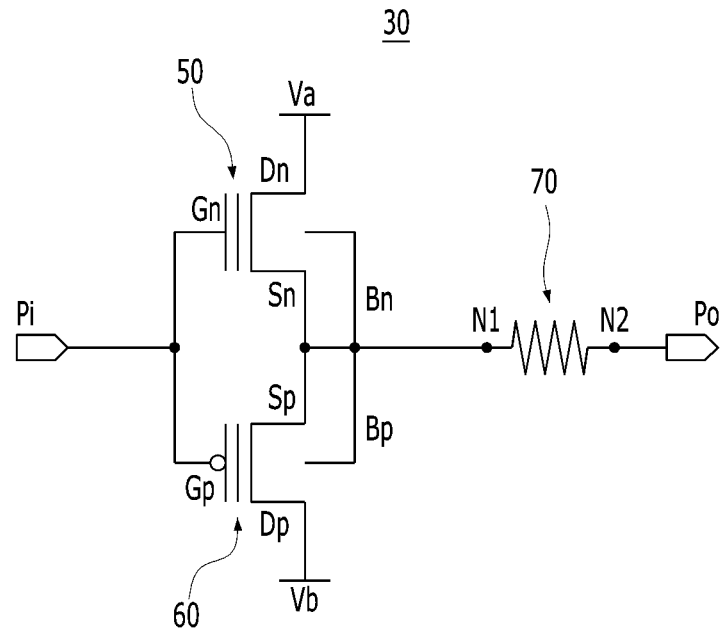
FIG. 2 is a circuit diagram schematically illustrating a synapse of a neuromorphic device in accordance with an embodiment of the present disclosure.

FIG. 2 is a circuit diagram schematically illustrating a synapse of a neuromorphic device in accordance with an embodiment of the present disclosure.

Referring to FIG. 2, a synapse 30 of a neuromorphic device in an embodiment of present disclosure may include an n-type ferroelectric field effect transistor (n-FeFET) 50, a p-type ferroelectric field effect transistor (p-FeFET) 60, and a resistive element 70. The resistive element 70 may have a variable resistor or a fixed resistor. A source electrode Sn of the n-FeFET 50 and a source electrode Sp of the p-FeFET 60 may be directly electrically connected to each other. The source electrode Sn of the n-FeFET 50 and the source electrode Sp of the p-FeFET 60 may be electrically connected to a first node N1 of the resistive element 70. A second node N2 of the resistive element 70 may be connected to an output port Po of the synapse 30. The output port Po of the synapse 30 may be electrically connected to a post-synaptic neuron 20 as shown in FIGS. 1A-1C and 4A-4C.

A gate electrode Gn of the n-FeFET 50 and a gate electrode Gp of the p-FeFET 60 may be directly electrically connected to each other. The gate electrode Gn of the n-FeFET 50 and the gate electrode Gp of the p-FeFET 60 may be electrically connected to an input port Pi of the synapse 30. The input port Pi of the synapse 30 may be electrically connected to a row line R shown in FIG. 1A, to a third row line Rc shown in FIG. 1B, or to an input port Pi shown in FIG. 1C.

A drain electrode Dn of the n-FeFET 50 may be electrically connected to a first reference voltage node Va. A body Bn of the n-FeFET 50 may be electrically connected to the source electrode Sn of the n-FeFET 50. The body Bn of the n-FeFET 50 may be electrically connected to the first node N1 of the resistive element 70. A drain electrode Dp of the p-type p-FeFET 60 may be electrically connected to a second reference voltage node Vb. A body Bp of the p-FeFET 60 may be electrically connected to the source electrode Sp of the p-FeFET 60. The body Bp of the p-FeFET 60 may be electrically connected to the first node N1 of the resistive element 70. Accordingly, the body Bn of the n-FeFET 50 and the body Bp of the p-FeFET 60 may be electrically connected to each other.

The first reference voltage node Va may supply a relatively high voltage to the drain electrode Dn of the n-FeFET 50 of the synapse 30. For example, the first reference voltage node Va may be connected to a power supply voltage node. The second reference voltage node Vb may supply a relatively low voltage to the drain electrode Dp of the p-FeFET 60 of the synapse 30. For example, the second reference voltage node Vb may be connected to a ground voltage node.

The first reference voltage node Va may be electrically connected to a first synaptic row line Ra as shown in FIG. 1B or FIG. 1C, as examples. The second reference voltage node Vb may be electrically connected to a second synaptic row line Rb as shown in FIG. 1B or FIG. 1C, as examples.

The input port Pi of the synapse 30 may be electrically connected to a row line R shown in FIG. 1A, to a third synaptic row line Rc shown in FIG. 1B, or to an input port Pi of FIG. 1C. The output port Po of a synapse 30 may be electrically connected to a column line C of FIG. 1A, to a column line C of FIG. 1B, or to a column line C of FIG. 1C.

Figure 3A:
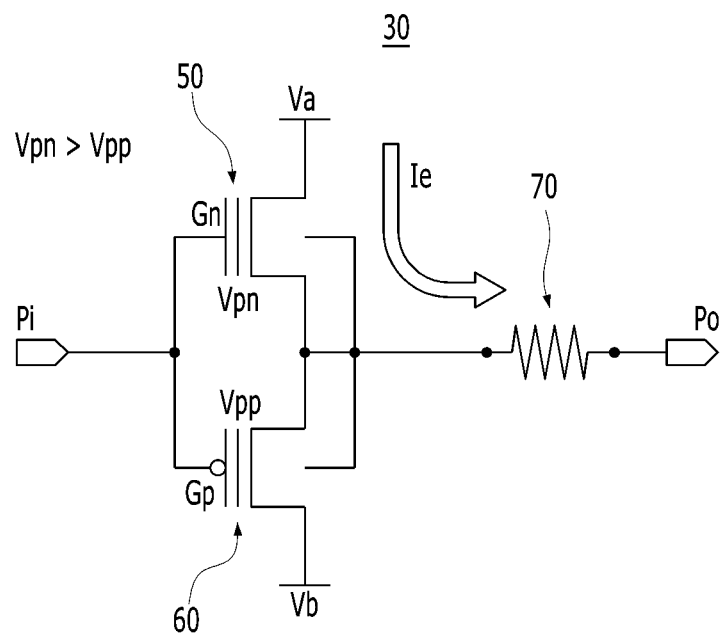
FIG. 3A is a diagram illustrating an excitatory synapse operation of a synapse of a neuromorphic device in accordance with an embodiment of the present disclosure.

FIG. 3A is a diagram illustrating in an embodiment of the present disclosure an excitatory synapse operation of a synapse 30 of a neuromorphic device in a read-out mode.

Referring to FIG. 3A, a synapse 30 having a positive (+) synapse weight can perform the excitatory synapse operation in a read-out mode. For example, when a polarization voltage Vpn of the gate electrode Gn of the n-FeFET 50 is greater than a polarization voltage Vpp of the gate electrode Gp of the p-FeFET 60, that is, the synapse weight of the synapse 30 is positive (+), and the read voltage Vrd is applied to the input port Pi, the n-FeFET 50 may be in a relatively turned-on state and the p-FeFET 60 may be in a relatively turned-off state. In this case, in the synapse 30, a current may flow from the first reference voltage node Va to the output port Po through the resistive element 70. The output port Po of a synapse 30 may be electrically connected to a column line C of FIG. 1A, to a column line C of FIG. 1B, or to a column line C of FIG. 1C. Thus, in an excitatory synapse operation, the current on the column line C connected to the output port Po can be increased. Therefore, the phrases "relatively turned-on state" and "relatively turned-off state" may mean that the contribution to current flow is relatively high or relatively low, respectively. In an embodiment, an excitatory synapse current flowing from the first reference voltage node Va to the output port Po through the resistive element 70 and through the n-FeFET 50 may be relatively greater than an inhibitory synapse current flowing from the output port Po to the second reference voltage node Vb through the resistive element 70 and through the p-FeFET 60. The resistive element 70 may have a variable resistor or a fixed resistor.

Figure 3B:
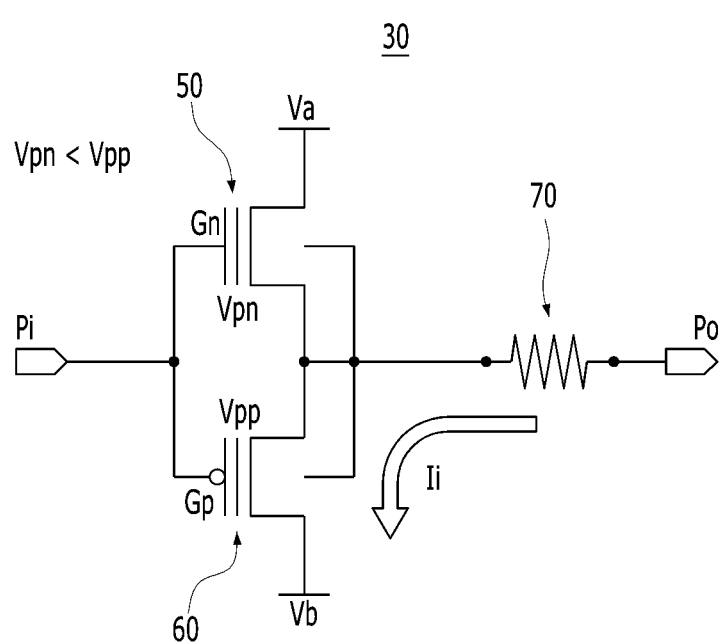
FIG. 3B is a diagram illustrating an inhibitory synapse operation of a synapse of a neuromorphic device in accordance with an embodiment of the present disclosure.

FIG. 3B is a diagram illustrating the inhibitory synapse operation of a synapse 30 of a neuromorphic device in a read-out mode in accordance with an embodiment.

Referring to FIG. 3B, a synapse 30 having a negative (−) synapse weight can perform the inhibitory synapse operation in a read-out mode. For example, when the polarization voltage Vpp of the gate electrode Gp of the p-FeFET 60 is greater than the polarization voltage Vpn of the gate electrode Gn of the n-FeFET 50, that is, the synapse weight of the synapse 30 is negative (−), and the read voltage Vrd is applied to the input port Pi, the p-FeFET 60 may be in a relatively turned-on state and the n-FeFET 50 may be in a relatively turned-off state. In this case, in the synapse 30, a current may flow from the output port Po to the second reference voltage node Vb through the resistive element 70. The output port Po of a synapse 30 may be electrically connected to a column line C of FIG. 1A, to a column line C of FIG. 1B, or to a column line C of FIG. 1C. Thus, in an inhibitory synapse operation, the current on the column line C connected to the output port Po can be decreased. In an embodiment, an inhibitory synapse current flowing from the output port Po to the second reference voltage node Vb through the resistive element 70 and through the p-FeFET 60 may be relatively greater than an excitatory synapse current flowing from the first reference voltage node Va to the output port Po through the resistive element 70 and through the n-FeFET 50. The resistive element 70 may have a variable resistor or a fixed resistor.

In an embodiment, read voltage Vrd may be variously set. For example, when read voltage Vrd is a positive (+) voltage, the n-FeFET 50 can be in a turned-on state. When read voltage Vrd is a negative (−) voltage, the p-FeFET 60 can be in a turned-on state. Even if the same read voltage Vrd is applied to the input port Pi, and therefore to the gate electrode Gn of the n-FeFET 50 and to the gate electrode Gp of the p-FeFET 60, n-FeFET 50 and p-FeFET 60 may each be in a turned-on state or in a turned-off state depending on the respective polarization voltages Vpn and Vpp of the gate electrodes Gn and Gp. Therefore, the read voltage Vrd may be zero (0), a positive (+) voltage, or a negative (−) voltage.

In an embodiment, the polarization voltage Vpn of the gate electrode Gn of the n-FeFET 50 and the polarization voltage Vpp of the gate electrode Gp of the p-FeFET 60 may be recorded in an off-line state. Accordingly, the polarization voltage Vpn of the gate electrode Gn of the n-FeFET 50 and the polarization voltage Vpp of the gate electrode Gp of the p-FeFET 60 may be set at fixed values, and the synapse weight of a synapse 30 may have a predetermined value.

Figure 4A:
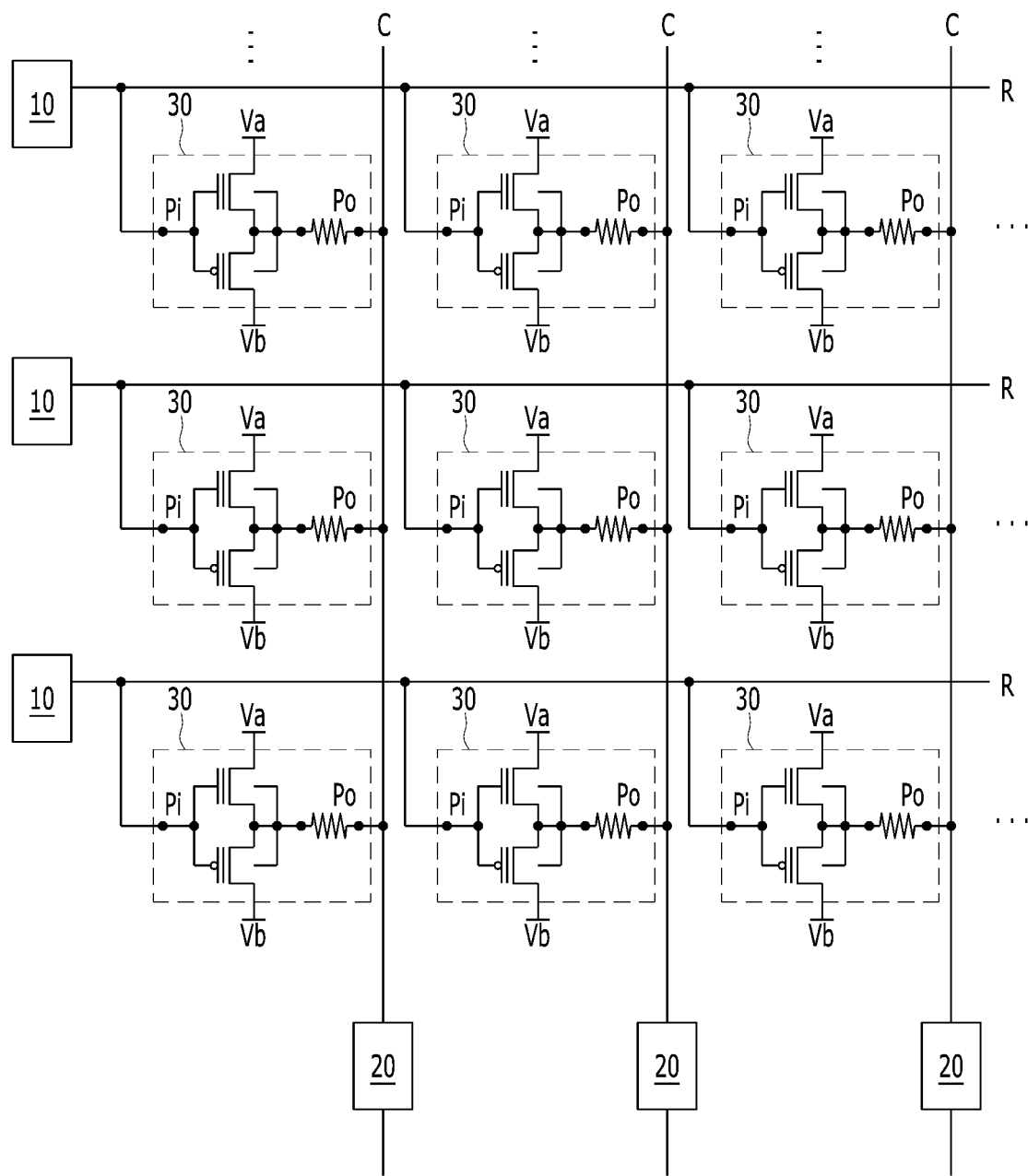
FIGS. 4A to 4C are block diagrams schematically illustrating synapse arrays of neuromorphic devices in accordance with embodiments of the present disclosure.
Figure 4B:
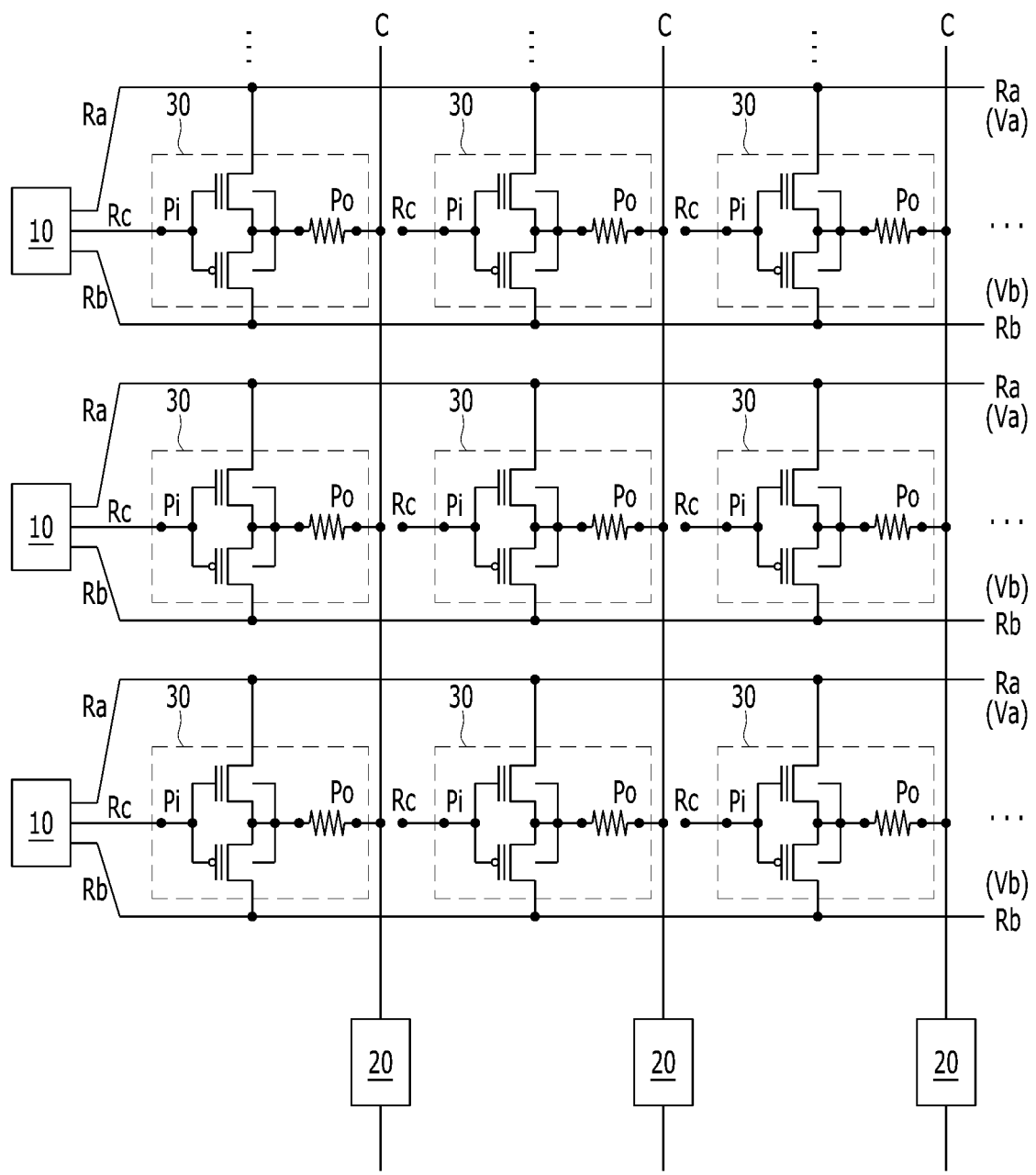
Figure 4C:
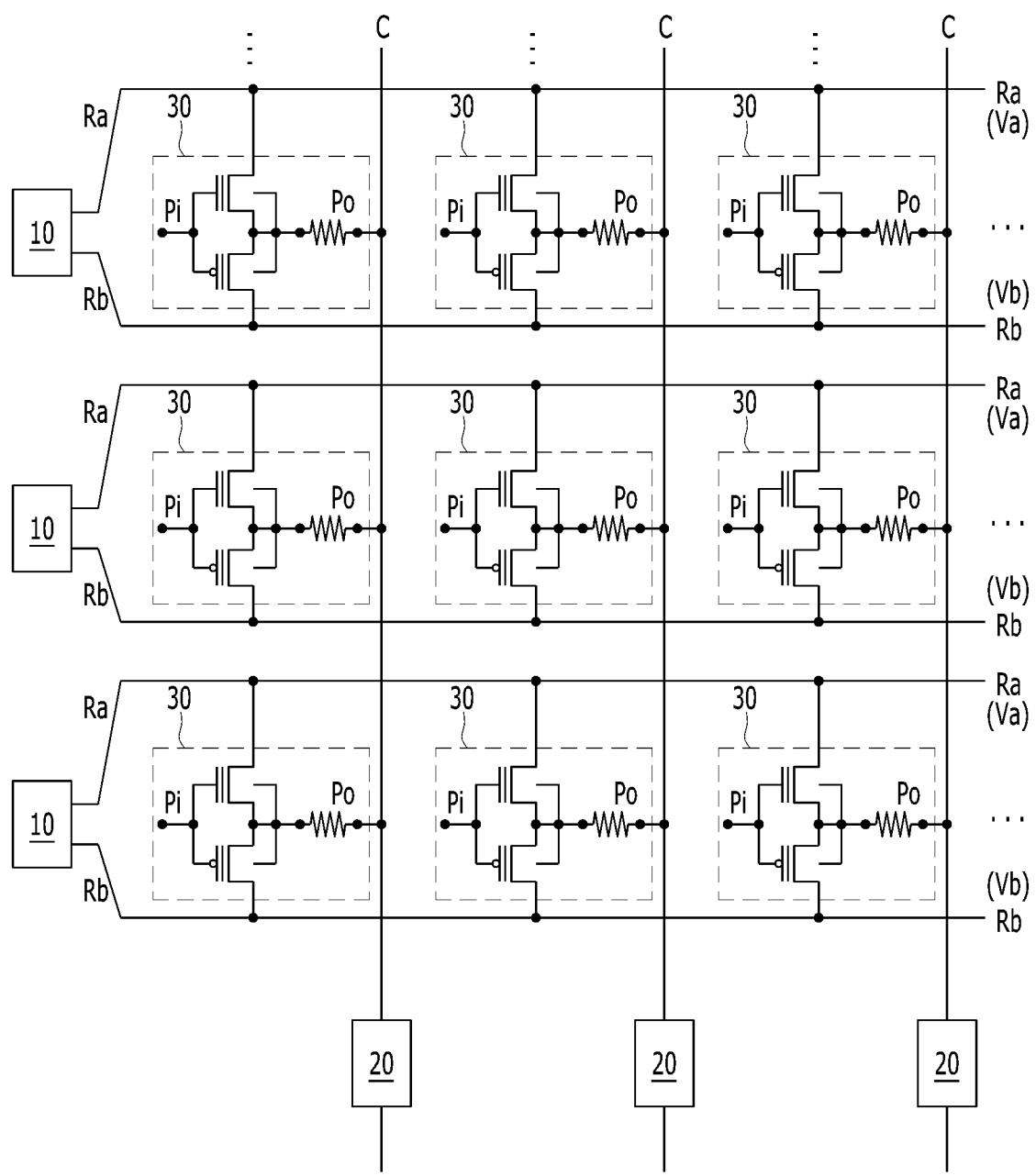

FIGS. 4A to 4C are block diagrams schematically illustrating synapse arrays of neuromorphic devices in accordance with embodiments of the present disclosure.

Referring to FIG. 4A, a synapse array of a neuromorphic device in accordance with an embodiment may include a plurality of pre-synaptic neurons 10, a plurality of row lines R extending from the pre-synaptic neurons 10 in a row direction, a plurality of post-synaptic neurons 20, a plurality of column lines C extending from the plurality of post-synaptic neurons 20 in a column direction, and a plurality of synapses 30 disposed on intersections between the row lines R and the column lines C. That is, synapses 30 may be disposed in intersection regions between row lines R and column lines C. Row lines R may be electrically connected to input ports Pi of the synapses 30. Thus, the row lines R may provide the read voltage Vrd to the synapses 30. The first reference voltage node Va of a synapse 30 may be electrically connected to a power supply voltage node, and the second reference voltage node Vb of the synapse 30 may be electrically connected to a ground voltage node. The output ports Po of the synapses 30 may be electrically connected to column lines C. Each of the synapses 30 can be enabled at the same time. For example, when the read voltage Vrd is applied to the input port Pi of each of the synapses 30 from the pre-synaptic neurons 10 through the row lines R, the synapses 30 can be enabled at the same time. Accordingly, the synapse weights of the enabled synapses 30 can be output through output ports Po to the column lines C. As an example, in a read-out mode, the synapse weights of the synapses 30 with output ports Po electrically connected to a common column line C can be output in parallel to the common column line C and at the same time.

Referring to FIG. 4B, a synapse array of a neuromorphic device in accordance with an embodiment may include a plurality of pre-synaptic neurons 10, a plurality of synaptic row lines R extending from the pre-synaptic neurons 10 in a row direction, a plurality of post-synaptic neurons 20, a plurality of column lines C extending from the post-synaptic neurons 20 in a column direction, and a plurality of synapses 30 disposed on intersections between the row lines R and the column lines C. That is, synapses 30 may be disposed in intersection regions between row lines R and column lines C.

The row lines R may include first synaptic row lines Ra, second synaptic row lines Rb, and third synaptic row lines Rc. Referring to FIG. 2, the first synaptic row lines Ra may be electrically connected to the first reference voltage nodes Va of the synapses 30 and provide a relatively high first reference voltage, i.e., the power supply voltage to the drain electrodes Dn of the n-FeFETs 50 of the synapses 30. The second synaptic row lines Rb may be electrically connected to the second reference voltage nodes Vb of the synapses 30 and provide a relatively low reference voltage, i.e., the ground voltage to the drain electrodes Dp of the p-FeFETs 60 of synapses 30. The third synaptic row lines Rc may be electrically connected to the input ports Pi of the synapses 30 and provide the read voltage Vrd to the gate electrodes Gn of the n-FeFET 50 and the gate electrode Gp of the p-FeFET 60 of the synapses 30.

Referring to FIG. 4C, a synapse array of a neuromorphic device in accordance with an embodiment of present disclosure may include a plurality of pre-synaptic neurons 10, a plurality of row lines R extending from the pre-synaptic neurons 10 in a row direction, a plurality of post-synaptic neurons 20, a plurality of column lines C extending from the post-synaptic neurons 20 in a column direction, and a plurality of synapses 30 disposed on intersections between the row lines R and the column lines C. That is, synapses 30 may be disposed in intersection regions between row lines R and column lines C.

The row lines R may include first synaptic row lines Ra and second synaptic row lines Rb. Referring to FIG. 2, the first synaptic row lines Ra may be electrically connected to the first reference voltage nodes Va of the synapses 30 and provide a relatively high first reference voltage, i.e., the power supply voltage to the drain electrodes Dn of the n-FeFETs 50 of the synapses 30. The second synaptic row lines Rb may be electrically connected to the second reference voltage nodes Vb and provide a relatively low reference voltage, i.e., the ground voltage to the drain electrodes Dp of the p-FeFETs 60 of synapses 30. The read voltage Vrd may be applied to the input ports Pi of the synapses 30. Thus, the read voltage Vrd may be commonly applied to the gate electrodes Gn of the n-FeFET 50 and the gate electrode Gp of the p-FeFET 60 of the synapses 30. As mentioned above, the read voltage Vrd may be any one of a positive (+) voltage, a negative (−) voltage, or zero (0).

Referring to FIGS. 4B and 4C, the synapses 30 electrically connected to the same row lines Ra and Rb can be enabled at the same time. For example, when the first reference voltage and the second reference voltage are applied to the synapses 30 through the first synaptic row lines Ra and the second synaptic row lines Rb respectively, the synapses 30 electrically connected to the same row lines Ra and Rb can be enabled at the same time. Accordingly, the synapse weights of the enabled synapses 30 electrically connected to the same row lines Ra and Rb can be output through output ports Po to the column lines C.

In another embodiment of the present disclosure, the synapses 30 electrically commonly connected to the row lines R, Ra, and, Rb can be in a turned-off state. Referring to FIGS. 4B and 4C, when a specific pre-synaptic neuron 10 applies a first reference voltage to first synaptic row lines Ra, and applies a second reference voltage to second synaptic row lines Rb, the synapses 30 electrically connected to the specific pre-synaptic neuron 10 can be placed in a turned-off state. In other words, when the pre-synaptic neuron 10 floats the first synaptic row line Ra and the second synaptic row line Rb, the synapse 30 electrically connected to the pre-synaptic neuron 10 can be placed in the turned-off state.

As described with reference to FIGS. 3A and 3B, the total sum of the current flowed to the post-synaptic neurons 20 through the column lines C may be varied depending on the synapse weights of the respective synapses 30. For example, the synapses 30 having positive (+) synapse weights can increase the current on the corresponding column lines C (excitatory synapse operation) and the synapses 30 having negative (−) synapse weights can reduce the current on the corresponding column lines C (inhibitory synapse operation).

Figure 5:
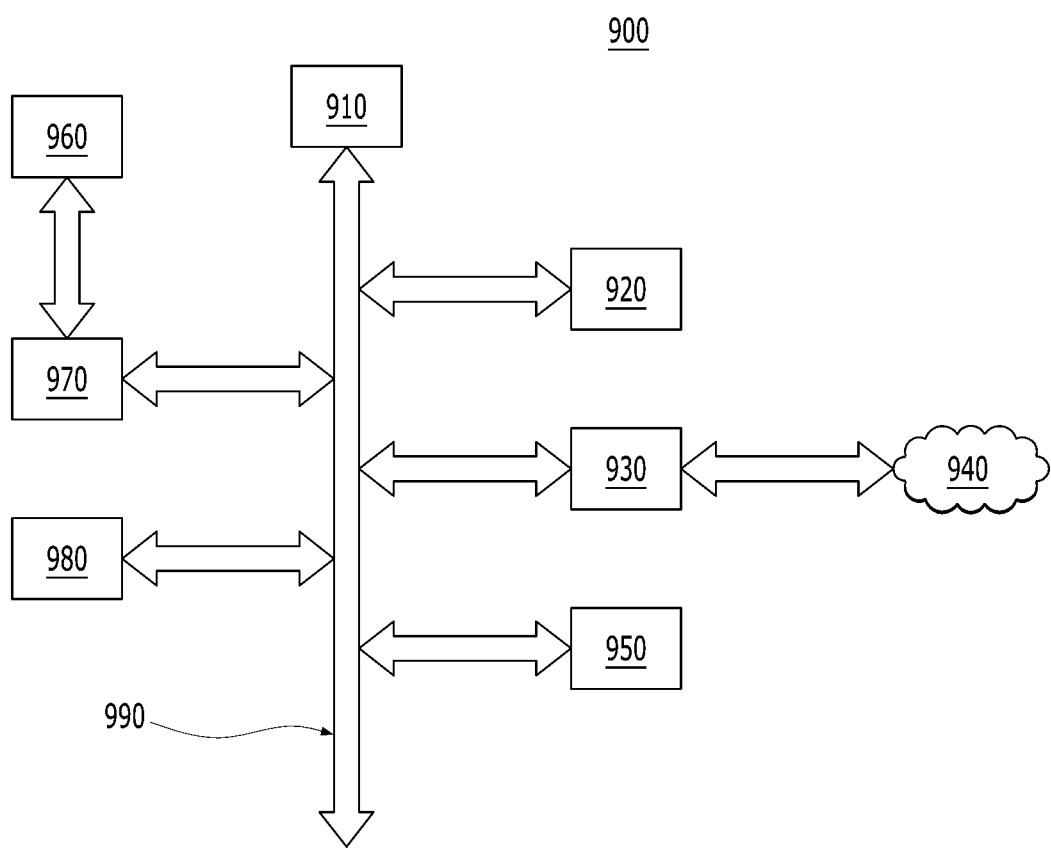
FIG. 5 is a diagram schematically illustrating a pattern recognition system in accordance with an embodiment of the present disclosure.

FIG. 5 is a diagram schematically illustrating a pattern recognition system in accordance with an embodiment of the present disclosure. For example, a pattern recognition system 900 may include a speech recognition system, an imaging recognition system, a code recognition system, a signal recognition system, and one or more systems for recognizing various patterns.

Referring to FIG. 5, in an embodiment of the present disclosure, the pattern recognition system 900 may include a Central Processing Unit (CPU) 910, a memory unit 920, a communication control unit 930, a network 940, an output unit 950, an input unit 960, an Analog-Digital Converter (ADC) 970, a neuromorphic unit 980, and/or a bus 990. The CPU 910 may generate and transmit various signals for a learning process of the neuromorphic unit 980, and perform various processes and functions for recognizing patterns according to an output from the neuromorphic unit 980. For example, the CPU 910 may perform processes and functions for recognizing a speech and imaging patterns based on the output from the neuromorphic unit 980.

The CPU 910 may be connected with the memory unit 920, the communication control unit 930, the output unit 950, the ADC 970, and the neuromorphic unit 980 through the bus 990. The memory unit 920 may store various pieces of information, which are required to be stored in the pattern recognition system 900. The memory unit 920 may include one or more of a volatile memory device, such as DRAM or SRAM, a nonvolatile memory, such as PRAM, MRAM, ReRAM or NAND flash memory, and various memory units, such as Hard Disk Drive (HDD) and Solid State Drive (SSD).

The communication control unit 930 may transmit and/or receive data to and/or from a communication control unit of another system through the network 940. For example, the communication control unit 930 may transmit speech and/or image recognition data through the network 940.

The output unit 950 may output data in various manners. For example, the output unit 950 may include a speaker, a printer, a monitor, a display panel, a beam projector, a hologrammer, or other various output devices, as non-limiting examples. The output unit 950 may output, for example, speech and/or image recognition data.

The input unit 960 may include any of a microphone, a camera, a scanner, a touch pad, a keyboard, a mouse, a mouse pen, or one or more of various sensors, as non-limiting examples.

The ADC 970 may convert analog data inputted from the input unit 960 into digital data.

The neuromorphic unit 980 may perform learning or recognition using the data outputted from the ADC 970, and output data corresponding to recognized patterns. The neuromorphic unit 980 may include one or more of the neuromorphic devices in accordance with the various embodiments described above.

In accordance with the embodiments of the present disclosure, a synapse of a neuromorphic device can perform both an excitatory synapse operation and an inhibitory synapse operation.

In accordance with the embodiments of the present disclosure, both an excitatory synapse operation and an inhibitory synapse operation can be performed in relation to a common column line so that the degree of integration in a neuromorphic device is increased.

In accordance with embodiments of the present disclosure, a ferroelectric field effect transistor can be in a relatively turned-on state or in relatively turned-off state depending on the polarization voltages of gate electrodes. Accordingly, the operation voltage of a synapse can be lowered and power consumption can be reduced.

Although various embodiments have been described for illustrative purposes, it will be apparent to those skilled in the art that various changes and modifications may be made without departing from the spirit and scope of the disclosure, as defined in the following claims.

What is claimed is:
1. A synapse array of a neuromorphic device comprising:
a pre-synaptic neuron;
a row line extending from the pre-synaptic neuron in a row direction;
a post synaptic neuron;
a column line extending from the post-synaptic neuron in a column direction; and
a synapse disposed at an intersection region between the row line and the column line,
wherein the synapse comprises
an n-type ferroelectric field effect transistor (n-FeFET) having a source electrode, a drain electrode, a gate electrode, and a body;
a p-type ferroelectric field effect transistor (p-FeFET) having a source electrode, a drain electrode, a gate electrode, and a body;

an input port electrically connected in common with the row line, the gate electrode of the n-FeFET, and the gate electrode of the p-FeFET; and a resistive element having two nodes, a first node electrically connected in common to the source electrodes of the n-FeFET and the p-FeFET and a second node electrically connected to the column line, and wherein the resistive element is a fixed resistor having a fixed resistance, the drain electrode of the n-FeFET is electrically connected to a power supply node to provide a fixed power supply voltage, and the drain electrode of the p-FeFET is electrically connected to a ground voltage node to provide a fixed ground voltage.

2. The synapse array of claim 1, wherein the body of the n-FeFET is electrically connected to the source electrode of the n-FeFET, and wherein the body of the p-FeFET is electrically connected to the source electrode of the p-FeFET.

3. A synapse array of a neuromorphic device comprising:

a plurality of pre-synaptic neurons;

a plurality of row lines extending from each of the plurality of pre-synaptic neurons in a row direction;

a plurality of post-synaptic neurons;

a plurality of column lines extending from each of the plurality of post-synaptic neurons in a column direction; and a plurality of synapses, each disposed at an intersection region between one of the plurality of row lines and one of the plurality of column lines;

wherein each of the plurality of synapses comprises:

an n-type ferroelectric field effect transistor (n-FeFET) having a source electrode, a drain electrode, a gate electrode, and a body;

a p-type ferroelectric field effect transistor (p-FeFET) having a source electrode, a drain electrode, a gate electrode, and a body;

an input port electrically connected in common to the gate electrode of the n-FeFET and the gate electrode of the p-FeFET; and a resistive element having two nodes, a first node electrically connected in common to the source electrode of the n-FeFET and the source electrode of the p-FeFET, and a second node electrically connected to one of the plurality of column lines, wherein each of the plurality of row lines comprises a first synaptic row line and a second synaptic row line extending from a pre-synaptic neuron in parallel with each other, each of the first synaptic row lines is electrically connected to the drain electrode of the n-FeFET to provide a fixed power supply voltage to the drain electrode of the n-FeFET, each of the second synaptic row lines is electrically connected to the drain electrode of the p-FeFET to provide a fixed ground voltage to the drain electrode of the p-FeFET, and the resistive element is a fixed resistor having a fixed resistance.

4. The synapse array of claim 3, wherein the body of and the source electrode of the n-FeFET and the body of and the source electrode of the p-FeFET are electrically connected to each other.

5. A synapse array of a neuromorphic device comprising:

a plurality of pre-synaptic neurons;

a plurality of row lines extending from each of the plurality of pre-synaptic neurons in a row direction, and each row line including a first synaptic row line, a second synaptic row line, and a third synaptic row line extending in parallel with each other;

a plurality of post-synaptic neurons;

a plurality of column lines extending from each of the plurality of post-synaptic neurons in a column direction; and a plurality of synapses, each disposed at an intersection region between one of the plurality of row lines and one of the plurality of column lines;

wherein each of the plurality of synapses comprises:

an n-type ferroelectric field effect transistor (n-FeFET) having a source electrode, a drain electrode, a gate electrode, and a body;

a p-type ferroelectric field effect transistor (p-FeFET) having a source electrode, a drain electrode, a gate electrode, and a body;

an input port electrically connected in common to the third synaptic row line, the gate electrode of the n-FeFET and the gate electrode of the p-FeFET; and a resistive element having two nodes, a first node electrically connected in common to the source electrode of the n-FeFET and the source electrode of the p-FeFET, and a second node electrically connected to one of the plurality of column lines, wherein each of the first synaptic row lines provides a fixed power supply voltage to the drain electrode of the n-FeFET, each of the second synaptic row lines provides a fixed ground voltage to the drain electrode of the p-FeFET each of the third synaptic row lines is electrically connected to the gate electrode of each of the n-FeFET and the p-FeFET, and the resistive element is a fixed resistor having a fixed resistance.

6. The synapse array of claim 5, wherein the body of and the source electrode of the n-FeFET and the body of and the source electrode of the p-FeFET are electrically connected to each other.

7. A method of operating a neuromorphic device comprising: setting a first polarization voltage and a second polarization voltage of the neuromorphic device, wherein the first polarization voltage is greater than the second polarization voltage, and applying a read voltage to the neuromorphic device to enable current flow, wherein the neuromorphic device comprises:

a pre-synaptic neuron;

a row line extending from the pre-synaptic neuron in a row direction;

a post synaptic neuron;

a column line extending from the post-synaptic neuron in a column direction; and a synapse disposed at an intersection region between the row line and the column line, wherein the synapse comprises an n-type ferroelectric field effect transistor (n-FeFET) having a source electrode, a drain electrode, a gate electrode, and a body;

a p-type ferroelectric field effect transistor (p-FeFET) having a source electrode, a drain electrode, a gate electrode, and a body;

an input port electrically connected in common with the row line, the gate electrode of the n-FeFET, and the gate electrode of the p-FeFET; and a resistive element having two nodes, a first node electrically connected in common to the source electrodes of the n-FeFET and the p-FeFET and a second node electrically connected to the column line, and wherein the resistive element is a fixed resistor having a fixed resistance, the drain electrode of the n-FeFET is electrically connected to a power supply node to provide a fixed power supply voltage, the drain electrode of the p-FeFET is electrically connected to a ground voltage node to provide a fixed ground voltage, the first polarization voltage polarizes the gate electrode of the n-FeFET, the second polarization voltage polarizes the gate electrode of the p-FeFET, and the read voltage is applied to the input port.

8. The method of claim 7,
wherein the body of and the source electrode of the n-FeFET and the body of and the source electrode of the p-FeFET are electrically connected to each other.

9. A method of operating a neuromorphic device comprising:
setting a first polarization voltage and a second polarization voltage of the neuromorphic device,
wherein the first polarization voltage is greater than the second polarization voltage, and applying a read voltage to the neuromorphic device to enable current flow,
wherein the neuromorphic device comprises:
a plurality of pre-synaptic neurons;
a plurality of row lines extending from each of the plurality of pre-synaptic neurons in a row direction;
a plurality of post-synaptic neurons;
a plurality of column lines extending from each of the plurality of post-synaptic neurons in a column direction; and
a plurality of synapses, each disposed at an intersection region between one of the plurality of row lines and one of the plurality of column lines;
wherein each of the plurality of synapses comprises:
an n-type ferroelectric field effect transistor (n-FeFET) having a source electrode, a drain electrode, a gate electrode, and a body;
a p-type ferroelectric field effect transistor (p-FeFET) having a source electrode, a drain electrode, a gate electrode, and a body;
an input port electrically connected in common to the gate electrode of the n-FeFET and the gate electrode of the p-FeFET; and
a resistive element having two nodes, a first node electrically connected in common to the source electrode of the n-FeFET and the source electrode of the p-FeFET, and a second node electrically connected to one of the plurality of column lines,
wherein
each of the plurality of row lines includes a first synaptic row line, a second synaptic row line, and a third synaptic row line extending from the plurality of pre-synaptic neurons in parallel with each other,
each of the first synaptic row lines provides a fixed power supply voltage to the drain electrode of the n-FeFET,
each of the second synaptic row lines provides a fixed ground voltage to the drain electrode of the p-FeFET,
each of the third synaptic row lines is electrically connected to the gate electrode of each of the n-FeFET and the gate electrode of each of the p-FeFET,
the resistive element is a fixed resistor having a fixed resistance,
the first polarization voltage polarizes the gate electrode of the n-FeFET, the second polarization voltage polarizes the gate electrode of the p-FeFET, and the read voltage is applied to the input port.

10. The method of claim 9,
wherein the body of and the source electrode of the n-FeFET and the body of and the source electrode of the p-FeFET are electrically connected to each other.

11. A method of operating a neuromorphic device comprising:
setting a first polarization voltage and a second polarization voltage of the neuromorphic device, wherein the second polarization voltage is greater than the first polarization voltage, and
applying a read voltage to the neuromorphic device to enable current flow,
wherein the neuromorphic device comprises:
a plurality of pre-synaptic neurons;
a plurality of row lines extending from each of the plurality of pre-synaptic neurons in a row direction;
a plurality of post-synaptic neurons;
a plurality of column lines extending from each of the plurality of post-synaptic neurons in a column direction; and
a plurality of synapses, each disposed at an intersection region between one of the plurality of row lines and one of the plurality of column lines;
wherein each of the plurality of synapses comprises:
an n-type ferroelectric field effect transistor (n-FeFET) having a source electrode, a drain electrode, a gate electrode, and a body;
a p-type ferroelectric field effect transistor (p-FeFET) having a source electrode, a drain electrode, a gate electrode, and a body;
an input port electrically connected in common to the gate electrode of the n-FeFET and the gate electrode of the p-FeFET; and
a resistive element having two nodes, a first node electrically connected in common to the source electrode of the n-FeFET and the source electrode of the p-FeFET, and a second node electrically connected to one of the plurality of column lines,
wherein
each of the plurality of row lines includes a first synaptic row line, a second synaptic row line, and a third synaptic row line extending from the plurality of pre-synaptic neurons in parallel with each other,
each of the first synaptic row lines provides a fixed power supply voltage to the drain electrode of the n-FeFET,
each of the second synaptic row lines provides a fixed ground voltage to the drain electrode of the p-FeFET,
each of the third synaptic row lines is electrically connected to the gate electrode of each the n-FeFET and the gate electrode of each the p-FeFET,
the resistive element is a fixed resistor having a fixed resistance,
the first polarization voltage polarizes the gate electrode of the n-FeFET,
the second polarization voltage polarizes the gate electrode of the p-FeFET, and
the read voltage is applied to the input port.

12. The method of claim 11,
wherein the body of and the source electrode of the n-FeFET and the body of and the source electrode of the p-FeFET are electrically connected to each other.

* * * * *